United States Patent Office 2,910,052
Patented Oct. 27, 1959

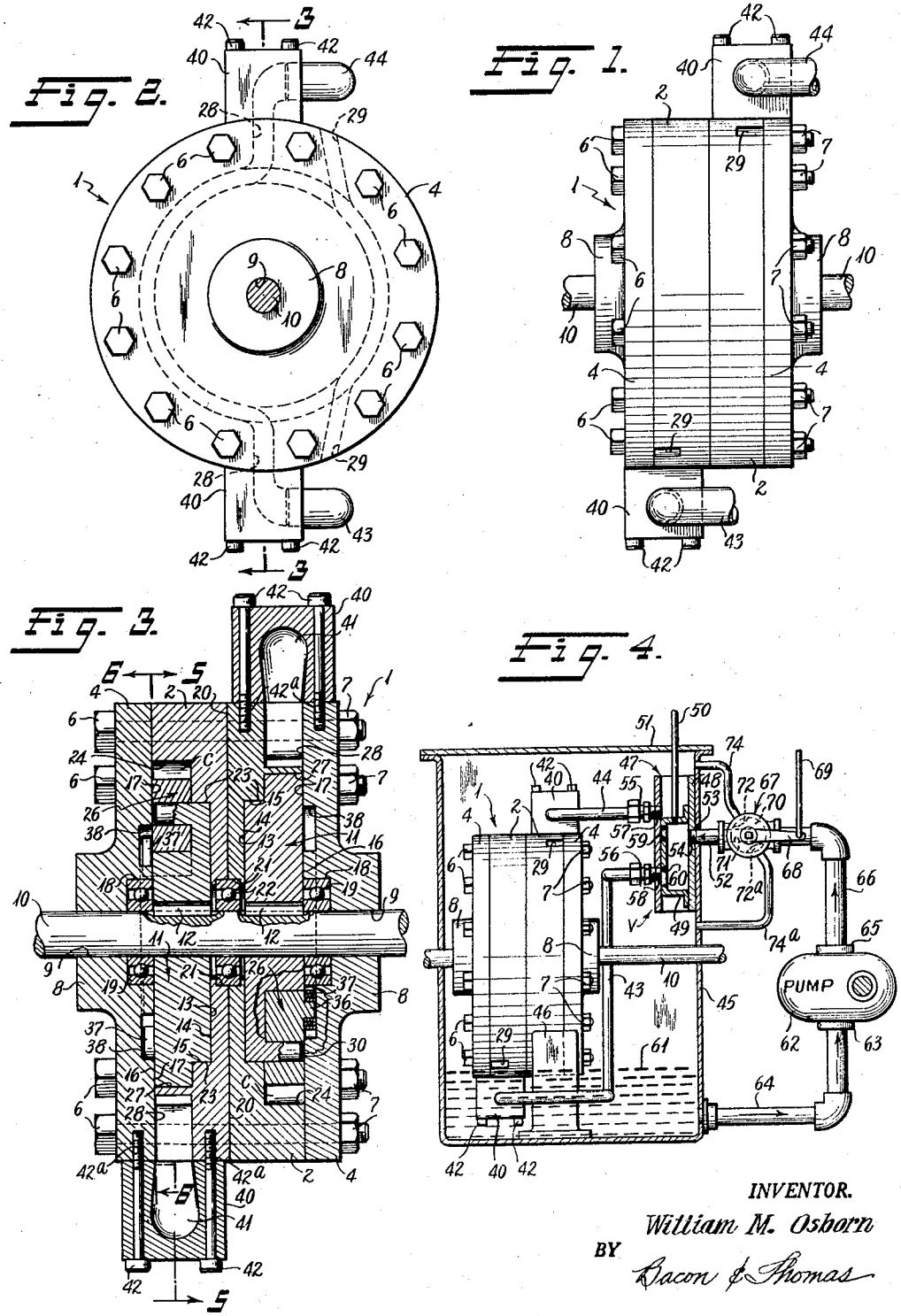

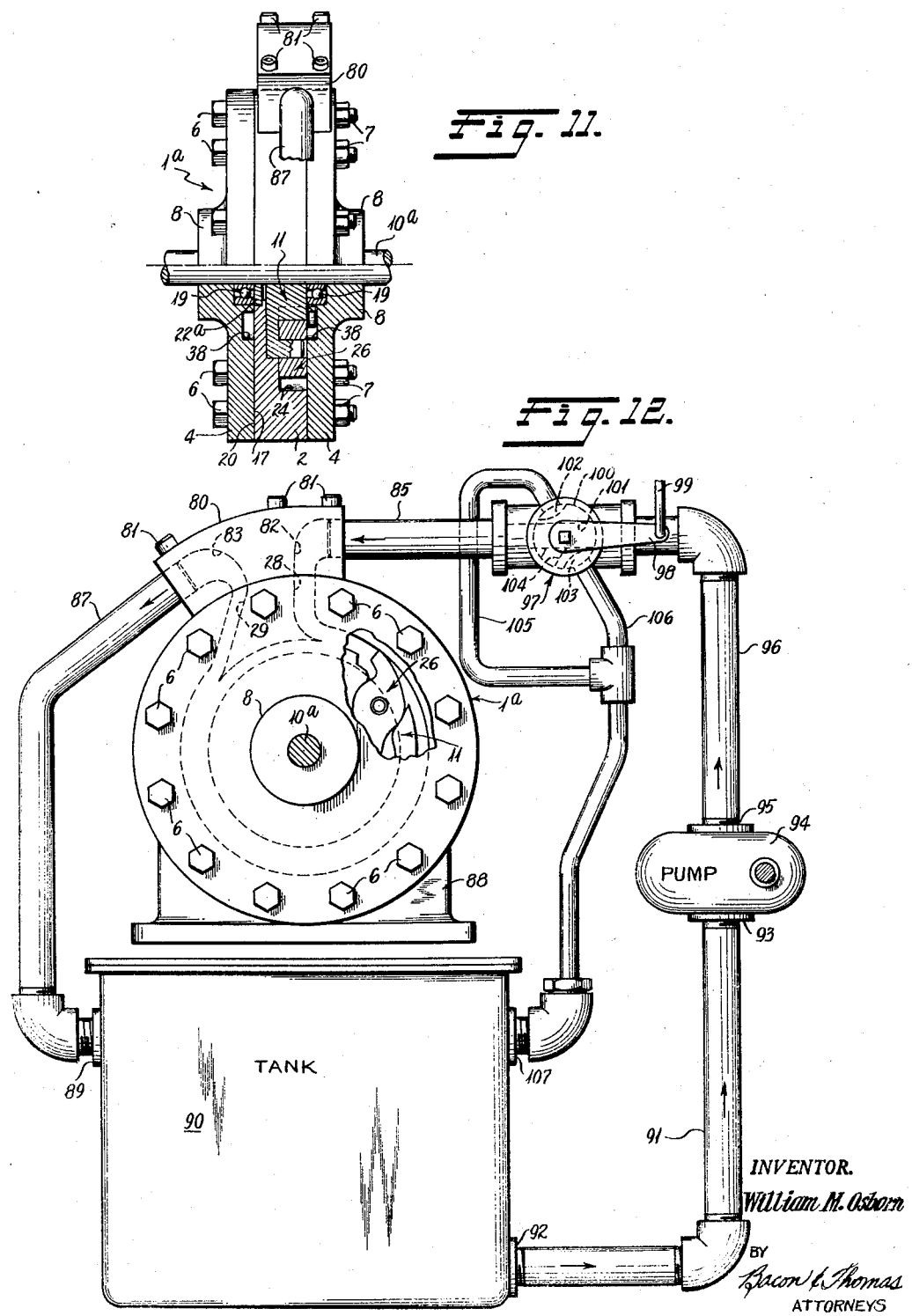

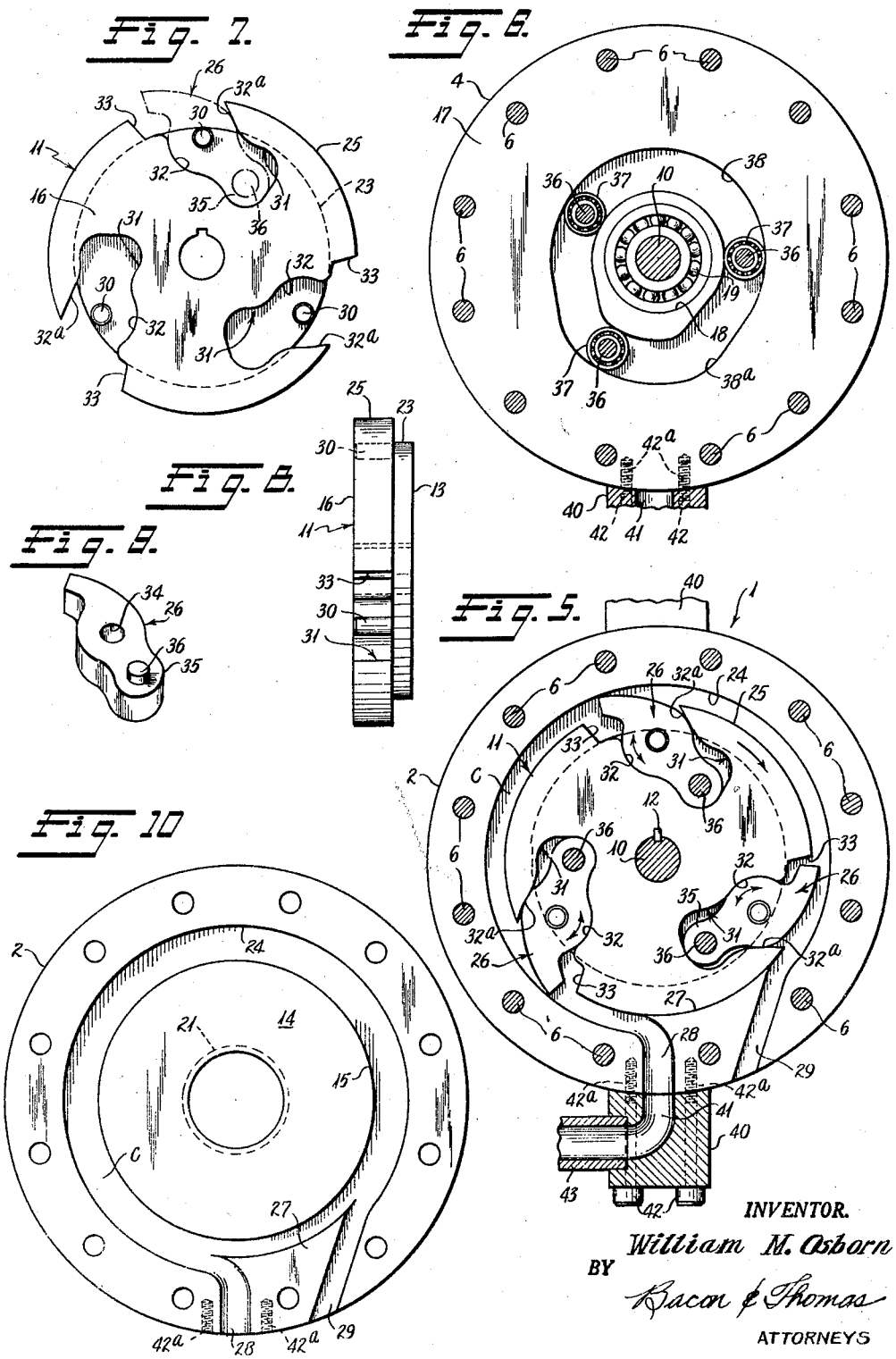

2,910,052

HYDRAULICALLY OPERATED TRANSMISSION

William M. Osborn, Denver, Colo.

Application November 22, 1955, Serial No. 548,420

11 Claims. (Cl. 121—93)

The present invention relates to an improved hydraulically operated unit adapted for various uses, such as a positive power transmitting means, a brake, an infinitely variable speed motor, a combined transmission and brake, etc.

More specifically, the invention relates to a device of the character referred to above which is highly efficient, has a minimum number of parts, many of which are interchangeable, operates substantially free of friction, and is substantially unaffected in its operation by centrifugal force.

The invention further relates to a high-speed hydraulic power transmitting system for motor vehicles, tractors and the like and to control means for such system.

In an important embodiment, the invention provides a novel rotor unit having a single rotor adapted to be driven in one direction, and so constructed that a hydraulic unit may either employ an identical pair of such rotor units disposed in back to back relation so that the rotors thereof may be selectively driven in opposite directions for effecting forward and reverse operations, or may employ a single rotor unit for purposes in which operation in only one direction is required. It is also contemplated that one or more single or double hydraulic units could be employed in the same system.

An object of the invention is to provide a hydraulically operated device employing a rotor unit of the character described.

Another object of the invention is to provide a hydraulically operated device of the character described which when used as a power transmitting unit, or a motor, can be selectively driven either in a forward or a reverse direction.

Another object of the invention is to provide a hydraulically-operated unit of the character described which includes very few parts, each of relatively simple construction and which can be interchangeably assembled and which can be readily manufactured on a mass production basis.

Another object of the invention is to provide a hydraulically-operated device including a rotor with pivoted vanes controlled by means of cam followers and associated cam tracks wherein the cam action provides smooth positive control permitting a fast operating unit.

Another object of the invention is to provide a tightly sealed, well-balanced, hydraulically-operated device wherein the necessity for employing packing means between the stationary and rotating parts is eliminated without any substantial loss in efficiency, notwithstanding the fact that the housing may be caused to expand slightly by the pressure of the operating fluid.

Another object of the invention is to provide a power transmitting unit adapted to be used in a hydraulic transmission system in a motor vehicle in lieu of conventional gear fluid-coupling or torque converter types of transmission. In this connection the present unit is such that it will not cause the vehicle to creep, which is a common fault of the latter two types of transmissions.

Still another object of the invention is to provide a hydraulic transmission system for a motor vehicle in which the driving unit is constructed and associated with control means in such manner that the unit can be caused to act as a brake for the vehicle.

Another object of the invention is to provide a hydraulic unit having a pair of identical rotors disposed with the rotor vanes thereof in opposite directions for forward and reverse operation, sealed in separate identical housing sections between common end plates whereby the rotor system is perfectly balanced and effectively sealed, and the manufacturing methods are simplified and production costs reduced.

Other objects and features of the invention will be apparent from the following description taken from the accompanying drawings in which:

Figure 1 is a side elevational view of a hydraulically operated unit embodying the principles of the present invention and utilizing a pair of interchangeable central housing and rotor sections whereby the device when used as a power transmitting unit, or as a motor, can be selectively driven in either a forward or reverse direction.

Figure 2 is a front elevational view of the hydraulically operated unit shown in Figure 1.

Figure 3 is a vertical sectional view through the unit taken on line 3—3 of Figure 2.

Figure 4 is a diagrammatic view illustrating the unit of Figure 1 connected in a system adapting the same to serve as a transmission for a motor vehicle.

Figure 5 is a vertical sectional view through the hydraulic unit taken on the line 5—5 of Figure 3 and showing one face of a rotor in elevation.

Figure 6 is a vertical sectional view through the hydraulic unit taken on the line 6—6 of Figure 3 and showing the inner face of an end section of the housing in elevation.

Figure 7 is an elevational view of the vane side of a rotor having two of the three rotor vanes omitted for purposes of illustration.

Figure 8 is a side elevational view of the rotor of Figure 7 with the rotor vanes omitted.

Figure 9 is a perspective view of a rotor vane utilized by the rotor shown in Figures 7 and 8.

Figure 10 is a side elevational view of the rotor side of a central housing section of the hydraulic unit.

Figure 11 is a side elevational view of a hydraulically operated unit embodying the principles of the invention but utilizing a single central housing section and rotor whereby the device when used for power transmission, or as a motor, is designed to be driven in only one direction.

Figure 12 is a diagrammatic view illustrating the unit of Figure 11 connected in a hydraulic system for power transmission or braking purposes.

Referring now to Figures 1, 2, 3 and 5, which illustrate a hydraulic unit having a pair of central rotor sections whereby the device may be driven in either forward or reverse directions, the hydraulic unit is generally identified by the numeral 1. Since the rotor member and housing sections forming the right half of the hydraulic unit 1 are identical to those forming the left half of the hydraulic unit 1, the corresponding parts thereof will be identified by the same reference numerals. Accordingly, hydraulic unit 1 comprises a housing including a pair of identical central housng sections 2 disposed in back to back relation between identical interchangeable end housng plates or sections 4. The end housing sections 4 and central housing sections 2 are held together in assembled relation by a plurality of bolts 6 which pass through registering opening in the aforesaid housing sections and are threaded on the ends to receive nuts 7. It is to be understood that the engaging faces of the end housing sections and central housing sections are machined so smoothly and are pulled up so tightly by means of bolts 6 and cooperating nuts 7 that no packing means need be disposed therebetween.

The end plates 4 are preferably made of bronze and have a hub portion 8 extending outwardly therefrom and provided with an opening 9 which serves as a journal for a shaft 10. The end plates 4 each cooperates with an associated central housing member 2 to provide a chamber C for a one piece rotor 11 (Figs. 3 and 5). The rotor 11, which preferably is made of bronze, is mounted on the shaft 10 within a central housing section 2 and is secured to the shaft 10 by a conventional key 12. The rotor 11 has a side face 13 which fits closely against the rear or bottom surface 14 of a recess 15 in the central housing member 2 which in cooperation with the inner face 17 of the end plate 4 forms the chamber C. The rotor 11 also has another side face 16 disposed in confronting relation with the inner face 17 of the end plate 4. The end plate face 17 is counterbored as at 18 for the reception of a conventional thrust bearing 19 which has engagement with the adjacent face 16 of the rotors 11. The clearances between the faces 16—17 and 13—14 are very small, only a matter of about one-thousandth of an inch or just enough to provide sufficient clearance to maintain a lubricating oil film. Moreover, the counterbore 18 is made of such depth that the thrust bearing 19 is preloaded to the extent of about 30 to 50 pounds as the housing parts and end sections are tightly drawn up by the bolts 6 and cooperating nuts 7. In addition, the bearing 19 has a fit relative to the counterbore 18 and the shaft 10, such that no sealing means for the shaft is necessary and the only tolerance provided is such that will facilitate the provision of an oil film to lubricate the shaft 10 in the housing hub portion 8.

The central housing sections 2, which are preferably made of aluminum alloy, have a flat face 20 (Fig. 3) adapted to fit flush against the corresponding face of another central member as in the double unit shown in Figures 1 and 3, or to receive in close fitting relation an end housing section as in the single unit shown in Figure 11. The surface 20 is provided with a counterbore 21 of a depth sufficient to receive one-half of a bearing 22 which is identical to the bearing 19 in the end plate 8. As best shown in Figure 3, where two central sections 2 are utilized in back to back relation, the bearing 22 is so disposed to form the central journal of a set of three. It will be understood that where a single central section 2 is employed as shown in Figure 11, the bearing 22 would be omitted and the space on the central member would be filled with a solid ring member 22a against which the thrust bearing 19 in the end plate would exert pressure. The central housing section 2 is cylindrically recessed on the opposite face from surface 20 to provide the recess 15, the inner portion of which is adapted to snugly receive an uninterrupted inner peripheral portion 23 (Fig. 8) of the rotor 11, and is further partially counterrecessed as at 24 to provide an inner chamber of sufficient diameter to leave a space between the periphery thereof and an outer circumferentially interrupted peripheral portion 25 of rotor 11 whereby to provide a working chamber in cooperation with vanes 26 of the rotor. The inner uninterrupted peripheal portion 23 of the rotor 11 and the inner recess 15 of the housing are finished to provide a close tolerance only sufficient to provide a running fit and thereby permit the formation of an oil lubricating film therebetween.

The central housing section 2 has an extension 27 (Figs. 5 and 10) of narrow circumferential dimension which has an inner peripheral surface of approximately the same diameter as the diameter of the periphery 25 of the rotor 11, sufficient clearance being provided only to facilitate the formation of an oil film between these parts for lubricating purposes. An inlet channel 28 and outlet channel 29 are provided on either side of the extension 27 and merge with the outer portion of the chamber C of the housing section so that operating fluid may be passed between the peripheral edge 25 of the rotor 11 and the periphery 24 of the chamber C to act upon the rotor vanes 26 as best shown in Figure 5. As will be apparent from Figure 3, the width of the inlet and exhaust ports 28 and 29 is approximately the same as the depth of the peripheral surface 25 and the thickness of vanes 26. It will be noted that the inlet and outlet ports are closely spaced on the same side of the housing. The novel manner in which the rotor and housing members are formed permits such close spacing, and this results in a working chamber C for the rotor vanes 26 extending throughout a substantial part of the circumference of the housing recess. Thus, the working chamber C may extend through an angle of at least 270° and preferably through approximately 300°. This enables the use of only three rotor vanes, at least two of which are fully extended at all times, and results in a well balanced and smooth operating unit.

As best shown in Figures 7 and 8, the body of the rotor 11 is formed in one piece, although it is contemplated that the rotor may be made from a plurality of flat plate sections if desired. The rotor shown is hollow milled to provide a plurality of projecting studs 30 and is further milled to provide recesses 31 having the configuration illustrated. It will be noted that the recesses 31 extend inwardly from the face 16 to the full depth of the outer interrupted portion of the rotor 11, that is, for a distance equal to about two-thirds of the depth of the entire rotor. Each of the recesses 31 includes an arcuate abutment portion 32 which is concentric with the stud 30, and further includes a notch 33 adapted to receive the working vanes of the rotor in one position thereof. The rotor is provided with three of the recessed portions equiangularly spaced as shown in Figure 7.

The rotor vanes or blades 26 are pivotally mounted in the recesses 31 upon the studs 30. These vanes 26 are interchangeable and each is provided with an opening 34 to receive its associated stud 30. Each of the blades or vanes 26 is also provided with a tail or extension 35 having a stud 36 projecting laterally therefrom. The vanes 26 are preferably made of bronze and the studs 36 may consist of an integral projection or a separate pin mounted in the tail portion 35. A conventional ball bearing 37 (Figs. 3 and 6) is mounted upon each of the studs 36. The ball bearings 37 function as cam followers, which are received in a cam track 38 (Fig. 6) formed in the inner face 17 of the end plate 4. The cam track 38 controls the disposition of the vanes 26 at all times so that when operating fluid (oil under pressure) acts upon the vanes 26 adequate torque is developed to positively turn the rotor 11.

The central housing sections 2 as shown in Figures 1–4 are each provided with an exterior member 40 for inlet port connections. The member 40 is attached to the central housing section 2 by means of bolts 42 which extend through suitable holes in the member 40 and into threaded openings 42a in the central housing section 2. The members 40 have an interior channel 41 and act as adapters to connect inlet ports 28 of the central housing sections 2 to conduits 43 and 44 through which operating fluid is introduced to the working chamber C as by means of a pump. The exhaust ports 29 may be permitted to exhaust to the atmosphere or to a reservoir containing the unit as the case may be. It will be noted that in the double unit shown in Figures 1-4 the oppositely disposed housing sections 2 are rotated with respect to one another to place the respective inlets approximately 180° apart.

When the unit 1 employing the two central housing sections is used as a transmission or as a motor, it is preferably mounted within a casing 45 as shown in Figure 4. In such instance one of the central housing sections 2 may be mounted within the casing 45 by any suitable means such as a saddle 46 as shown to prevent the unit from turning relative to the casing. The control means for the hydraulic unit is diagrammatically illustrated and generally identified by the numeral 47 and comprises a fluid distribution valve V that is preferably mounted within the casing 45 as shown. The fluid distribution valve V includes a hollow body 48 containing a D type slide valve 49 having an operating rod 50 connected to the upper end thereof and projecting through the casing cover 51. A supply pipe 52 extends through an opening 53 in the side wall of the casing 45 and is mounted in a threaded opening 54 in the valve body 48 so that it communicates with the interior of the valve body and with the interior of the slide valve 49. Conventional pipe nipples 55 and 56 communicate between conduits 44 and 43 of the hydraulic unit and ports 57 and 58 in the valve body 48. The slide valve has ports 59 and 60 adapted to be selectively placed in registration with the ports 57 and 58 respectively formed in the valve body 48. Thus, when the slide valve is in the position illustrated in Figure 4, the port 58 registers with the port 60 so that operating fluid under pressure can then flow through the conduit 43 to the working chamber of the left central housing member 2. On the other hand, when the slide valve is moved upwardly to establish communication between the valve port 59 and the housing port 57, operating fluid under pressure will flow through the conduit 44 to the working chamber in the other housing member 2 shown to the right on Figure 4. It will be noted that the exhaust ports 29 of both central sections 2 empty into the casing 45, which is preferably at atmospheric pressure. Any operating fluid that may work its way out of the hydraulic unit other than through the exhaust ports 29 while the unit is in operation will merely discharge into the casing 45.

The casing 45 forms a reservoir or sump for the operating fluid, preferably a good grade of lubricating oil, indicated at 61. A conventional pump 62 adapted to be driven by a vehicle engine or other means (not shown) has its inlet side 63 connected with the lower portion of the casing 45 by a pipe 64. The outlet 65 of the pump is connected by means of a pipe 66 through a rotary control valve 67 to the pipe 52 which extends into the casing 45 and slide valve housing 48. The pump 62 is preferably of the type that has a built-in bypass so that oil can be bypassed instead of being delivered into pipe 66 in the event that excess pressure is developed in the pipe. The oil 61 within the casing 45 is, of course, under atmospheric pressure so that the spent operating fluid can readily be discharged from the exhaust ports 29 of the hydraulic unit 1 and collect within the housing 45. While the pump 62 has been shown outside of the casing 45, it is to be understood that it may be mounted within said casing if desired.

The rate at which operating fluid is supplied to the unit 1 is controlled by the valve 67. Hence the valve 67 is operable to control the speed of the unit 1. The valve 67 may be of the rotary type as shown, and is controlled by a lever 68 having an operating rod 69 connected thereto. The lever 68 is connected to a core 70 disposed in the body of the valve 67, said core having a diametrically extending through port 71 and arcuate ports 72 and 72a. The diametric port 71 controls the flow of operating fluid through the valve 67 and permits full flow therethrough when the valve core 70 is in the position illustrated in Figure 4, whereas the arcuate ports 72 and 72a serve to bypass operating fluid when the core 70 is rotated counterclockwise from the position shown in Figure 4. At the latter such time the arcuate port 72 communicates with an opening in the casing 45 through a conduit 74, and the arcuate port 72a communicates with an opening in casing 45 through a conduit 74a. The provision of the bypass means is made particularly for instances where it is desired to also use the unit 1 as a brake, as will be more fully explained hereinafter. Any adjustment of the core 70 from a true horizontal position will restrict the volume of operating fluid to the unit 1 and in this way the speed of the unit 1 can be regulated in either forward or reverse drive. It will be understood, of course, that upon rotation of the valve core in a direction clockwise to that illustrated in Figure 4, complete obstruction of fluid flow through the pipe 66 may be effected.

Figure 5 illustrates the relative position of the vanes 26 at one angular position of the rotor. Since the vanes 26 are under positive action of the cams 37 this relation will be the same regardless of the direction of rotation of the shaft 10 and rotor. It will be noted that the rotor vane 26 shown at the bottom right-hand portion of Figure 5 is partially retracted by means of the cam follower 37 acting upon the associated stud 36 of the tail portion 35. The vane 26 is completely recessed within the notch 33 of the rotor 11 at the time it passes the extension 27 of the housing member. Accordingly, it will be seen that operating fluid may act upon the vanes 26 for a substantial part of the circumference of the housing member. The cam track 38 formed in the end housing section 4 is provided with a single lobe or eccentric portion 38a (Fig. 6) in which the cam followers 37 are guided to retract the vanes 26 during their rotation past the extension 27 in the housing chamber. Since a single lobe is provided it may be gradually tapered whereby smooth operation of the rotor unit and vanes is facilitated without sacrificing a material portion of the effective working area of the chamber C.

It will be understood that the rotor 11 in the outer housing section as shown in Figure 5 will be disposed on shaft 10 in an opposed relation to the rotor 11 in the inner housing section so that the vanes of the latter would be inclined in the opposite direction. Accordingly, should the slide valve 49 be adjusted to provide operating fluid to the rotor on the other side of that shown in Figure 5 so as to turn the shaft counterclockwise, the ends of the vanes 26 of the rotor 11 shown would be operating against any fluid within the peripheral area between the rotor and the housing. Since the exhaust ports 29 are above the oil level in tank 45, such fluid would be present only when the slide valve 49 is readjusted for braking or locking action as explained hereinafter. The vanes 26, however, of both rotors during clockwise or counterclockwise revolution are under the influence of the positive action of the respective cam followers 37 and are retracted sufficiently to pass the extension 27. The slope of the cam track 38a in the end members 4, while gradual, is such that the respective vanes 26 are held in their advanced position until they rather closely approach the extension 27 defining the working area whereupon they are smoothly and quickly retracted to clear the extension and are smoothly and quickly extended as soon as they have passed the same. It will be noted that by provision of the cam track 38 with a single cam lobe 38a and by the use of three vanes 26, only one of the vanes 26 is retracted at the time that the other two vanes are fully extended. Accordingly, two vanes are in fully extended position in the chamber at all times, thereby effectively preventing bypass. While this arrangement permits the use of a cam lobe with a relatively gradual oscillation whereby a fast operating unit is provided, it will be understood that a greater number of vanes may be provided if so desired. The clearance between the studs 30 and the openings 34 in the vanes 26 is such that the vanes 26 engage the abutments 32 and 32a to transmit rotating torque to the rotor 11, so that the studs 30 are substantially relieved of all shearing stresses. This, of course, is conducive to minimum wear between studs 30 and vanes 26.

The close fit of all working parts makes it possible to operate the unit with a very high efficiency at comparatively low pressures. When the present unit is used as the transmission in a motor vehicle, for example, speeds of 70 miles an hour or higher can readily be obtained with pressures of 200 pounds per square inch. Another advantage obtained with the unit when using the same as a transmission is that no slip occurs in the drive of the shaft so that immediately upon admission of operating fluid into the unit, positive rotation of the rotor 11 and shaft 10 occurs. Moreover, the slide valve member 49 can be so adjusted to provide an intermediate position whereby some of the operating fluid is available to simultaneously act upon the blades of both sets of rotors at opposite sides of the unit to thus lock the shaft against rotation and thereby avoid annoying creep at times when the vehicle is to remain stationary without requiring the operator to apply the usual foot brake.

Assuming that the delivery of operating fluid through the conduit 43 effects clockwise drive of the shaft to provide a forward drive of the vehicle, then it will be apparent that upon shifting the valve member 49 to the extreme position, the flow of operating fluid will be through conduit 44 to act upon the rotor 11 in the other housing section whereby the shaft 10 will be turned in a counterclockwise direction to effect reverse operation of the vehicle. It will also be apparent that both forward and reverse drives can be maintained at any desired speed by manipulating the lever 68 of the valve 67 to control the rate at which operating fluid is supplied.

In the embodiment of the invention shown in Figure 11, which illustrates a single hydraulic unit generally designated as 1a, a single central housing section 2 is employed between end plates 4. The end plate shown to the left in Figure 11 is bolted tightly against the face 20 of the central section 2. Thus, it is apparent that hydraulic devices employing interchangeable parts may be employed either as double units for forward and reverse operation, or as a single unit for operation in one direction.

The single unit 1a shown in Figure 11 may be employed in a system such as that shown in Figure 12, wherein an auxiliary member 80 is mounted as by means of bolts 81 upon the central housing section 2 to provide communicating passages 82 and 83, respectively, between inlet port 28 and a conduit 85 and outlet port 29 and a conduit 87. The central section 2 may be mounted on a saddle 88 which may be placed upon a suitable base to prevent rotation of the unit. Exhaust conduit 87 is connected by means of a conventional fitting 89 to a tank 90 which is employed as a reservoir for operating fluid, which in this case may also be a light lubricating oil. A conduit 91 communicates from a conventional fitting 92 opening into the bottom of the tank 90 to the inlet side 93 of a pump 94, of any conventional type, adapted to be driven by suitable means not shown. The outlet 95 of the pump 94 communicates through conduit 96 and control valve 97 to inlet conduit 85.

The valve 97 may be of the rotary type as shown, similar to that of the control valve 67 shown for the double unit in Figure 4, and is provided with a lever 98 connected to a control rod 99. The lever 98 is connected to a core 100 having a diametrically extending through port 101, arcuate ports 102 and 103 and a radial port 104. The diametric port 101 controls the flow of operating fluid through the valve 97, whereas the arcuate ports 102 and 103 serve to bypass the operating fluid through conduits 105 and 106 and conventional fitting 107 to the tank 90 when the core 100 is turned counterclockwise. The radial port 104 serves to connect line 85 to the tank 90 through the port 101 and conduits 105 and 106 when the core 100 is rotated clockwise from the position shown in Figure 12, the flow of operating fluid from conduit 96 at the time being cut off. Since the tank 90 is at atmospheric pressure, this adjustment of the valve core is effective to connect the inlet port 28 of the unit 1a to atmospheric pressure. The radial and arcuate ports are utilized primarily when the unit 1a is employed for braking purposes as explained more fully hereinafter. Any adjustment of the core 100 from a true horizontal position will restrict the flow of operating fluid to the unit 1a, and in this way the speed of the unit 1a can be controlled in any desired manner.

In using the unit 1a as a power transmission unit, or motor, operating fluid is pumped by the pump 94 from the tank 90 through conduit 96, control valve 97, and conduit 85 into the inlet port 28, whereupon the fluid acting upon the vanes of the rotor move the rotor in a clockwise direction thereby transmitting power to the shaft 10a. The operating fluid is exhausted through exhaust port 29 and conduit 87 back to the tank 90, which, as aforementioned, preferably is under atmospheric pressure. It will be understood that the unit 1a may be mounted within the tank 90 containing the operating fluid if so desired, whereupon conduit 87 would be unnecessary and an adapter similar to that of the double unit shown in Figure 4 could be used.

While either the double unit, as shown in Figures 1 through 4, or the single unit as shown in Figures 11 and 12 may be employed as a vehicle transmission or motor in the manner previously described, it will be understood that these units further possess the desirable features of being able to function as an independent brake by connecting the rotor shaft to the part whose rotation is to be retarded or controlled. The double unit may be used effectively to brake in either direction, while the single unit would be effective as a brake for only one direction of rotation of the shaft. The control or extent of the braking effect obtained will vary in accordance with the adjustment of the control valve 67 of the unit shown in Figure 4 or of control valve 97 of the unit shown in Figure 11. It will be further appreciated that the double unit 1, together with the control means therefor, as shown in Figure 4, is adapted to be used not only as a transmission to drive the shaft 10, but also as a brake for said shaft through manipulation of the slide control valve 49 which selects the rotor unit to which operating fluid is supplied. The shaft may thus be driven or braked in either direction and the same control valve 67 which controls the speed of transmission may be used to control the degree of braking.

Assuming that the shaft 10 of the double unit 1 shown in Figures 1–5 is a vehicle propeller shaft whose rotation it is desired to retard, and assuming that the shaft 10 is rotating in a counterclockwise direction as viewed in Figure 5, then a braking effect can be applied to the shaft 10 by admitting a limited flow of operating fluid through conduit 43 to the chamber C to tend to reverse the direction of the shaft 10 by the action of the operating fluid on the vanes of this rotor. To do this, the valve core 70 (Fig. 4) is adjusted by rotating the same counterclockwise so that the arcuate port 72 establishes communication between the pipe 66 and the by-pass conduit 74 and the arcuate port 72a establishes communication from the pipe 52 to by-pass conduit 74a. The result of such adjustment of the valve core 70 is that a portion of the fluid delivered by pump 62 is by-passed through conduits 74 and 74a to the interior of casing 45. Further the port 71 is preferably positioned so that the amount of operating fluid that can be delivered to the unit 1 is insufficient to instantly stop, or drive the rotor 11 in the opposite direction, but is sufficient to gradually retard rotation of the rotor 11 by the shaft 10, by requiring the vanes 26 to back the admitted fluid out of the chamber C until the individual vanes pass the inlet port 28 whereupon sufficient fluid surges back into the unit to fill the working chamber to act against the next succeeding vane 26 to retard its movement toward the inlet port 28. During the braking action some fluid will be continuously bypassed through the arcuate ports 72 and 72a to conduits 74 and 74a. The resistance offered to the backing out of the fluid can be regulated by the adjustment of lever 68 so that the braking effect can be gradually applied and increased or decreased, as desired, until the turning effort of the shaft 10 has been completely overcome.

Assuming that the shaft 10a of the unit as shown in Figures 11 and 12 is connected with a vehicle propeller shaft whose rotation it is desired to retard, and assuming further that the shaft 10a normally rotates in a clockwise direction as viewed in Figure 12, then a braking effect can be applied to the shaft 10a by opening the valve 97 to the desired extent to supply fluid in a direction tending to urge the shaft in a clockwise direction. It will be understood that during normal rotation of the shaft 10a in a counterclockwise direction no operating fluid would be supplied to the hydraulic unit 1a and the valve core 100 would be turned in a clockwise direction to connect the inlet conduit 85 through radial port 104 and diametrical port 101 to the tank 90 through conduits 105 and 106. The tank 90 being open to atmospheric pressure, the inlet 28 of the unit 1a would therefore also be open to atmospheric pressure so that no braking action would occur until control valve 97 is manipulated.

It will be understood that various changes may be made in the details of construction and configuration of the parts of the unit disclosed herein without departing from the principles of the invention or the scope of the annexed claims.

I claim:

1. A fluid actuated device, comprising: a housing having a rotor chamber therein, said housing having a hub portion projecting outwardly therefrom on opposite sides thereof; a shaft rotatably mounted in said hub portions and extending through said chamber; a rotor in said chamber fixed to said shaft, said rotor having side faces confronting the inner faces of said housing and having an outer peripheral portion provided with equal angularly-spaced recesses and an inner uninterrupted peripheral portion of smaller diameter snugly received in a recessed portion of said housing with only close operating clearance therebetween; vanes pivotally mounted in the recesses in said rotor, said housing having a portion of the internal periphery thereof removed for a substantial circumferential distance to provide a working chamber for said vanes; means for admitting operating fluid under pressure into said chamber at one end thereof; means for discharging operating fluid from said chamber at the opposite end thereof; and means for positively controlling the pivotal movement of said vanes relative to said working chamber as said rotor rotates.

2. The fluid actuated device of claim 1 wherein the working chamber extends through an angle of at least approximately 270°.

3. The fluid actuated device of claim 1 wherein the working chamber extends through an angle of at least approximately 270° and wherein the rotor is provided with three pivotally mounted vanes equiangularly spaced.

4. The fluid actuated device of claim 1 wherein the working chamber extends through an angle of approximately 300° and wherein the inlet opening for operating fluid is adjacent one end thereof and the discharge port is adjacent the other end thereof.

5. The fluid actuated device of claim 1 wherein the working chamber extends through an angle of approximately 300° and wherein the rotor is provided with three pivotally mounted vanes equiangularly spaced, and wherein the means controlling the pivotal action of the vanes maintains at least two of the three vanes fully extended to the outer periphery of the working chamber at all times.

6. The fluid actuated device of claim 1 wherein the means for admitting operating fluid under pressure into said chamber and the means for discharging operating fluid from said chamber includes ports through the periphery of said housing.

7. A fluid actuated device, comprising: a central housing section having a cylindrical recess and a counterrecess therein; an end housing section on opposite sides of said cylindrically recessed housing section, one of which cooperates therewith to form a rotor chamber including said recessed portions; means extending through said sections and securing the same together, each of said end housing sections having a hub portion projecting outwardly therefrom; a shaft rotatably mounted in said hub portions and extending through said chamber; a rotor in said chamber fixed to said shaft, and having a side face confronting the inner face of one of said end housing sections and an inner cylindrically uninterrupted portion snugly fitted in said recessed portion of the housing with only close operating clearance therebetween, said rotor further having an outer portion of larger diameter received within the counterrecessed portion of said housing; vanes pivotally mounted in recesses formed in said outer portion of said rotor, said cylindrically recessed housing section having a portion of the inner periphery of the counterrecessed portion removed to provide a working chamber for said vanes; means for admitting operating fluid under pressure into said chamber; and means positively controlling the pivotal movement of said vanes relative to the working chamber as said rotor rotates.

8. A fluid actuated device, comprising: a pair of identical central housing sections in back to back relation, each having a rotor chamber therein; an end housing section on the outer face of each of said central housing sections providing a hub, a bearing carried by said central housing sections, the inner faces of said central housing sections including cooperating means to support said bearing; a shaft rotatably mounted in said hubs and bearing and extending through said rotor chambers; interchangeable rotors in said rotor chambers disposed to be driven in opposite directions; the inner faces of said central housing sections having a configuration to interchangeably fit either a corresponding face of an identical central housing section or an end housing section.

9. A rotor having a circumferentially continuous peripheral portion on one side thereof and a circumferentially interrupted peripheral portion of larger diameter on the other side thereof having recesses extending inwardly from said interrupted portion; studs projecting from said continuous peripheral portion into the recesses of the circumferentially interrupted peripheral portion; a vane in each recess pivotally mounted upon the stud therein, each vane having an extension located within its associated recess, and a cam follower mounted upon each extension.

10. A rotor as defined in claim 9 in which the vanes are of a depth substantially equal to the depth of the recesses, and the cam followers are disposed in a plane adjacent said face of said rotor.

11. A fluid actuated device, comprising: a central housing section having a cylindrical recess therein to form a rotor chamber and having a central opening in a side wall thereof; end housing sections on opposite sides of said recessed central housing section; removable means extending through said sections and securing the same together; a bearing in each of said end housing sections; a shaft rotatably mounted in said bearings and extending through said rotor chamber and said central opening; a rotor in said chamber fixed to said shaft, and having a side face confronting the inner face of one of said end housing sections; coacting means on said rotor and said central housing section to provide a variable volume chamber when the rotor turns; and a counterbore about said central opening adapted to receive a bearing plate when an adjoining end housing section is added, or adapted to receive a bearing member when said adjoining end housing member is omitted and a similar central housing section of a fluid actuated device having an end housing section closing its recess, is placed in back-to-back relation to said first central housing section.

References Cited in the file of this patent

UNITED STATES PATENTS

| | | |
|---|---|---|
| 38,721 | Avery | June 2, 1863 |
| 52,459 | Stiles | Feb. 6, 1866 |
| 144,941 | Woods | Nov. 25, 1873 |
| 156,814 | Peck | Nov. 10, 1874 |
| 1,389,466 | White | Aug. 30, 1921 |
| 1,953,029 | Smith | Mar. 27, 1934 |
| 2,720,191 | Vas | Oct. 11, 1955 |